Patented Aug. 2, 1927.

1,637,481

UNITED STATES PATENT OFFICE.

WALTER GLAESER, OF BROOKLYN, NEW YORK.

METHOD OF PRODUCING MERCURY.

No Drawing.    Application filed November 14, 1924. Serial No. 750,000.

The present invention relates, as indicated, to a method of producing mercury, and is particularly directed to an improved and economical method of producing mercury from cinnabar ore and at the same time producing mercurous chloride, which is commonly known as calomel. To the accomplishment of the foregoing and related ends, said invention, then, consists of the means hereinafter fully described and particularly pointed out in the claims.

The following description sets forth in detail one approved method of carrying out the invention, such disclosed mode, however, constituting but one of the various ways in which the principle of the invention may be used.

In carrying out the present method I crush cinnabar ore to a fineness allowing it to pass a fine screen of 80 to 150 mesh and then add to this finely crushed ore sufficient water to produce a thin paste, and to this paste I add a sufficient amount of acid to destroy the basicity of the mixture caused by the possible presence of any carbonates, hydroxides and the like in the original rock. The amount of acid needed is generally relatively small. However, the excess of acid employed in the mixture should be equivalent to the amount of mercury present in the ore. To this acidified paste is now added a hypochlorite of an alkali or alkaline earth metal, preferably a solution of sodium or calcium hypochlorite. The reactions which take place are, first, interaction between the sodium hypochlorite and the acid which, for instance, will be considered as hydrochloric acid, to give sodium chloride and nascent chlorine. In practice I prefer to add a hypochlorite solution to a but slightly acidified paste of crushed cinnabar ore and water and to liberate nascent chlorine from this mixture by means of carbonic acid, which is supplied either as gas or as sodium bicarbonate. I then decompose the sodium or calcium carbonate formed by adding an amount of acid equivalent to the amounts of carbonates produced. The nascent chlorine acts with the cinnabar ore to form mercuric chloride while any excess chlorine reacts with water to form hydrochloric acid and free oxygen, the free oxygen combining with the free sulphur produced to form sulphuric acid anhydride, which, with water, forms sulphuric acid. This sulphuric acid acts with the mercuric chloride to form mercuric sulphate and hydrochloric acid. During the reaction the mixture should be heated to a temperature of between 50 and 90 degrees C. in order to hasten the speed of the reaction, and should be agitated in order to secure a high yield of mercury and also to promote the speed. The mercuric chloride and the mercuric sulphate are both in solution from which they are removed, after or without previous filtration, upon the addition of finely divided metal, which may be either iron, zinc, copper, aluminum, metal alloys, or, in fact, practically any metal. The mercuric chloride and the mercuric sulphate are both in solution and react with the metal which is present to form an amalgam between this metal and the mercury, and a chloride and a sulphate of the metal.

After the formation of the amalgam between the mercury and the free metal present the amalgam is removed from the solution, washed, and then heated in a cast iron still at a temperature sufficient to drive off the mercury, say above 360° C., the mercury being collected in this way, while the metal is purified from the mercury and may be used over again in the process.

Instead of acting upon the mercuric chloride and the mercuric sulphate, which are both in solution, with metal to obtain the mercury in form of an amalgam, I may desire to produce calomel, which is mercurous chloride, from the mercuric chloride and the mercuric sulphate solution. For this purpose I subject the mixture containing the mercuric chloride and the mercuric sulphate in solution to filtration, in order to separate the insoluble residue consisting of rock from this solution. To this solution I now add a solution of mercurous nitrate in sufficient amount to produce a formation of mercurous chloride according to the following equation:

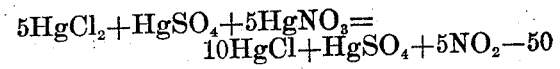
$$5HgCl_2 + HgSO_4 + 5HgNO_3 = 10HgCl + HgSO_4 + 5NO_2 - 50$$

The mercurous chloride which is thus formed is insoluble in the solution and is separated from the solution by filtration, then dried and purified by resublimation.

The mercuric sulphate contained in the mother liquor from the mercurous chloride is acted upon by metal filings to obtain its mercury content in the form of a metal amalgam as described above.

The reactions which take place in the mixture during the hypochlorite treatment and the treatment with metal I believe to be as follows:

1. $NaOCl + 2HCl = NaCl + H_2O + Cl_2$ (nascent).
1a. $2NaOCl + CO_2 = Na_2CO_3 + O + Cl_2$ (nascent)
1b. $Ca(OCl)_2 + 2NaHCO_3 = CaCO_3 + Na_2CO_3 + H_2O + O + Cl_2$ (nascent)
2. $HgS + Cl_2 = HgCl_2 + S$
3. $Cl_2 + H_2O = 2HCl + O$
4. $S + O_3 = SO_3$
4a. $HgS + 2O_2 = HgSO_4$
5. $SO_3 + H_2O = H_2SO_4$
6. $6HgCl_2 + H_2SO_4 = 5HgCl_2 + HgSO_4 + 2HCl$
7. $Na_2CO_3 + 2HCl = 2NaCl + CO_2 + H_2O$
8. $5HgCl_2 + HgSO_4 + 12Fe = 6HgFe + 5FeCl_2 + FeSO_4$ The present process is simple and inexpensive and may be used to produce either calomel and some metallic mercury, or metallic mercury alone at a considerable saving over the methods which are now in use. I have found that nascent bromine or iodine will act equally as well as chlorine in promoting the reactions described above for the formation of either the mercury amalgam or the calomel.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of extracting mercury from finely divided cinnabar ore, the step which consists in reacting upon such ore with a hypochlorite of an alkaline or alkaline earth metal and a metal, thereby liberating mercury and forming an amalgam with the metal present.

2. In a method of extracting mercury from finely divided cinnabar ore, the steps which consist in reacting upon cinnabar ore with a metal and a hypochlorite of an alkaline or alkaline earth metal and then removing the resulting amalgam of the metal and the mercury and heating the same to free the mercury therefrom.

3. In a method of extracting mercury from finely divided cinnabar ore, the steps which consist in reacting upon cinnabar ore with a metal and a hypochlorite of an alkaline metal, then removing the resulting amalgam of the metal and the mercury, and heating the same to free the mercury therefrom.

Signed by me, this 20th day of September, 1924.

WALTER GLAESER.